United States Patent [19]

Holbein et al.

[11] Patent Number: 4,752,398
[45] Date of Patent: Jun. 21, 1988

[54] METHOD FOR REMOVING MERCURY AND OTHER RELATED METALS FROM A LIQUID MEDIUM

[76] Inventors: Bruce E. Holbein, Dreve des Chasseurs 4, 1410 Waterloo, Belgium; David Brener, 5547 Ashdale, Côte St Luc, Quebec, Canada; Charles W. Greer, 414 Morningside Cr., Dollard des Ormeaux, Quebec, Canada; Eric N. C. Browne, 307-740 Place Fortier, St Laurent, Quebec, Canada

[21] Appl. No.: 31,111

[22] Filed: Mar. 27, 1987

Related U.S. Application Data

[62] Division of Ser. No. 762,417, Aug. 5, 1985, Pat. No. 4,654,322.

[51] Int. Cl.$^4$ .............................................. B01D 15/04
[52] U.S. Cl. .................... 210/679; 210/688; 423/22; 423/24; 423/100; 423/139; 423/DIG. 14; 75/101 BE; 75/117; 75/118 R; 75/119; 75/120; 75/121
[58] Field of Search ...................... 210/688, 691, 679; 423/22, 24, 100, 139, DIG. 14; 75/101 BE, 117, 118 R, 119, 120, 121

[56] References Cited
U.S. PATENT DOCUMENTS 4,623,680  11/1986  Azarnia et al. ..................... 423/100
4,654,322  3/1987   Holbein et al. ..................... 502/403
4,670,160  6/1987   Moriya et al. ..................... 423/100

OTHER PUBLICATIONS

Ito, Yuki et al., "Immobilization of Protein Ligands on New Formyl-Spacer-Carriers for the Preparation of Stable and High Capacity Affinity Adsorbents" J. Biochem., vol. 97, No. 6, 1985, pp. 1689–1694.
Yokota, Noriyuki et al., "Removing Trace Amounts of Mercury from a Gas" cited in Chem. Abs. 83(8):6997C, (Jp 49/35504, 9/24/74, 3 pp..

Primary Examiner—Robert L. Stoll
Attorney, Agent, or Firm—Schwartz, Jeffrey, Schwaab, Mack, Blumenthal & Mack

[57] ABSTRACT

A method for removing mercury and other related metals such as cadmium, zinc, copper, silver, from a liquid medium. This method comprises the step of contacting the liquid medium with an insoluble composition comprising an suitable insoluble carrier and a cysteine residue covalently fixed at the nitrogen atom thereof to the surface of the carrier.

9 Claims, No Drawings

METHOD FOR REMOVING MERCURY AND OTHER RELATED METALS FROM A LIQUID MEDIUM

CROSS-REFERENCE

This application is a division of application Ser. No. 762,417 filed on Aug. 5, 1985 now U.S. Pat. No. 4,654,322.

BACKGROUND OF THE INVENTION

The present invention relates to a method for the removal of mercury and/or other related metals selected from the group consisting of cadmium, zinc, copper, gold, platinum, palladium and nickel, from a liquid medium, using to do so an insoluble composition of which the active metal binding component comprises a residue of cysteine.

Due to the toxic nature of mercury, it is extremely important to be able to reduce to a minimum the amount discharged to the environment in liquid medium. Sources of such potential polluting media are numerous; they include, for example, the depleted brine solution obtained from the manufacture of chlorine and caustic soda by electrolysis of brine using mercury as a cathode.

It is also important economically to recover or separate from a liquid solution valuable metals such as Cd, Zn, Cu, Ag, Au, Pt, Pd or Ni.

SUMMARY OF THE INVENTION

The present invention provides a method for removing one or more of the above metals from a liquid medium, which method comprises the step of contacting the liquid medium with an insoluble composition comprising:
(i) a cysteine residue covalently fixed at the nitrogen atom thereof to the surface of,
(ii) a suitable insoluble carrier.

DETAILED DESCRIPTION OF THE INVENTION

The insoluble composition used in the method according to the invention more particularly comprises
(i) a metal binding group covalently fixed to the surface of,
(ii) a suitable insoluble carrier, said metal binding group having the formula

wherein cys is a cysteine residue and R' is a hydrocarbon chain of at least 3 chain atoms interrupted, if desired, by one or more heteroatoms selected from the group consisting of oxygen and nitrogen, said metal binding group being covalently fixed to the surface of the carrier via a silica to oxygen to carrier bond, the cysteine residue being covalently fixed at the nitrogen atom thereof to R', the carrier being an inorganic carrier.

Thus, the nitrogen atom of the cysteine residue may be fixed to the surface of the carrier by a covalent linkage comprising a chain of atoms, said chain including an additional nitrogen atom covalently linked to the nitrogen atom of said cysteine residue by a hydrocarbon chain of five carbon atoms. This hydrocarbon chain may comprise five methylene group and the additional nitrogen atom and nitrogen atom of the cysteine residue may each be linked to the hydrocarbon chain by a single covalent bond.

The insoluble composition comprising:
(i) a cysteine residue covalently fixed at the nitrogen atom thereof to the surface of,
(ii) a suitable insoluble carrier,
may be prepared by a process characterized in that cysteine is reacted with a suitable reactive insoluble carrier in order to obtain an insoluble composition as defined above.

More particularly, the insoluble composition comprising:
(i) a metal binding group covalently fixed to the surface of,
(ii) a suitable insoluble carrier,
said metal binding group having the formula

wherein cys is a cysteine residue and R' is a hydrocarbon chain of at least 3 chain atoms interrupted, if desired, by one or more heteroatoms selected from the group consisting of oxygen and nitrogen, this binding group being covalently fixed at the nitrogen atom thereof to R', said carried being an inorganic carrier, may be prepared by a process wherein cysteine is reacted with a suitable reactive insoluble carrier, said reactive carrier having covalently fixed to its surface a reactive group of formula

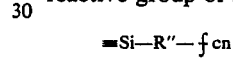

wherein R" is a hydrocarbon chain interrupted, if desired, by one or more heteroatoms selected from the group consisting of oxygen and nitrogen, and cn is a functional group reactive with the amino group of cysteine to covalently fix cysteine to said carrier at the nitrogen atom thereof, said reactive group being covalently fixed to the surface of said carrier via a silica to oxygen to carrier bond, said carrier being an inorganic carrier, said group —R"—⨍cn being reactive with cysteine to form the group —R'—cys.

To prepare an insoluble composition comprising:
(1) a cysteine residue covalently fixed at the nitrogen atom thereof to the surface of
(2) a suitable insoluble carrier,
wherein said nitrogen atom of the cysteine residue is fixed to the surface of the carrier by a covalent linkage comprising a chain of atoms, said chain including an additional nitrogen atom covalently linked to the nitrogen atom of said cysteine residue by a hydrocarbon chain of five carbon atoms, cysteine is subjected to a Schiff base reaction with a suitable aldehyde activated insoluble carrier, each of the aldehyde functional groups,

of said carrier being fixed to the surface of the carrier by a chain of atoms, each said chain including a nitrogen atom covalently linked to a respective

group by a hydrocarbon chain of 4 carbon atoms, and, if desired, the obtained product is subjected to a Schiff base reduction treatment with a suitable reducing agent to obtain an insoluble composition as defined above.

To prepare an insoluble composition comprising:
(1) a cysteine residue covalently fixed at the nitrogen atom thereof to the surface of
(2) a suitable insoluble carrier,
wherein the nitrogen atom of said cysteine residue is fixed to the surface of the carrier by a covalent linkage comprising a chain of atoms, said chain including an additional nitrogen atom covalently linked to the nitrogen atom of said cysteine residue by a hydrocarbon chain of five methylene groups and wherein said additional nitrogen atom and the nitrogen atom of said cysteine residue are each linked to said hydrocarbon chain by a single covalent bond, (a) a suitable amino activated insoluble carrier having amino groups covalently fixed to its surface is subjected to a Schiff base reaction with glutaraldehyde to obtain an aldehyde activated carrier, each of the aldehyde functional groups

of said carrier being fixed to the surface of the carrier by a chain of atoms, each said chain including a nitrogen atom covalently linked to a respective

group by a hydrocarbon chain of 4 carbon atoms, and
(b) said aldehyde activated carrier is then subjected to a Schiff base reaction with cysteine; and the obtained product is subjected to a Schiff base reduction treatment with a suitable reducing agent to obtain an insoluble composition as defined above.

In accordance with the present invention, Hg, Cd, Zn, Cu, Ag, Au, Pt, Pd and Ni may be removed from a liquid medium by contacting said medium with an insoluble composition as defined above.

The insoluble compositions as defined above, loaded with mercury or another metal, may possibly be regenerated by chemical means suitable for the removal of the bound metal; the so regenerated composition can thereafter be recycled for further use.

The insoluble composition used in accordance with the present invention have a very high affinity for mercury and can be used to remove mercury from a solution even if mercury is present in trace amount.

They also have a high affinity for cadium, zinc, copper, silver, gold, platinum, palladium and nickel and can be used to remove the same from a solution.

The cysteine residue can be depicted as follows:

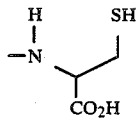

Having both an acidic (—CO₂H) and a basic

functional group, the cysteine residue can exist as a cation or anion depending upon its immediate environment.

The carrier can be organic or inorganic in nature. For example, the carrier may be a natural or modified natural polymer (e.g. lignin, agar, alginate, glucan, cellulose, dextran, cellulose acetate, humic acid, etc.) or a synthetic organic polymer (e.g. a polyamide, a polyamine, a polyacrylamide, a polyester, a polyurethane, a polyethylene, a polystyrene, a polypropylene, a polycarbonate, a silicone, nylon, latex, a polyfluoroolefin, etc.). An inorganic material is, however, preferred (e.g. ceria, titania, alumina, yttria, sepiolite or other such materials having surface hydroxyl groups).

A carrier suitable in accordance with the present invention, must of course be insoluble in the liquid medium of intended use; for example, the carrier can be water insoluble. Desirably, the carrier is also inert in the liquid medium of intended use. The carriers can be in particulate or solid form.

Any suitable means of covalently fixing organic coordinating sites to a carrier can be used to prepare the compositions provided that the necessary metal chelating or metal binding activity of the cysteine residue is maintained. The process of preparation is carried out such that the cysteine residue is covalently fixed via its nitrogen atom to the surface of the carrier. Cysteine can be bound in this manner to an aldehyde activated silica gel via Schiff base reaction.

Other known processes are also suitable for the binding of cysteine to carriers so as to preserve the chelating or complexing properties thereof. For example, the commonly used methods for covalently binding enzymes to insoluble carriers can be adapted for the immobilization of cysteine. See, for example <<Methods of Enzymology>>, XXXIV B:30 (Jakoby W. B. Ed.) Academic Press, New York (1974).

Carriers which may advantageously be used for the process of preparing compositions are those which already have active surfaces; the active surfaces having functional groups which can react with the amino group of cysteine. The functional group can, for example, be selected from the class consisting of

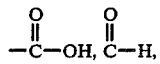

—CH₂—X, X being a halogen atom, for example, Br, or

X being, as defined above,

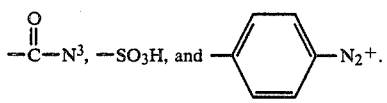

Any functional group can of course be used which can be made to react with the amino group of cysteine to bind cysteine to the carrier, the obtained composition having metal chelating or metal binding activity.

A useful carrier may need to have its surface treated in order to provide the surface with a suitable functional group which can bond to cysteine. An inorganic carrier having surface hydroxyl groups may, for example, be treated with a suitable amino silane to obtain an amino activated carrier which can in turn be treated with a bifunctional compound to provide the carrier with a functional group which can react with the amino group of cysteine. The aminosilane may, for example, have the following formula

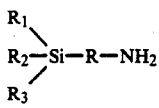

wherein R is a divalent organic radical of up to 20 carbon atoms (e.g. alkylene of up to 20 carbon atoms) and $R_1$, $R_2$ and $R_3$ are independently selected from the class consisting of a hydrogen atom, a halogen atom (e.g. Cl), a $C_{1-20}$ alkyl group, a $C_{1-20}$ alkyl group substituted by a $C_{6-14}$ aryl group, a $C_{6-14}$ aryl group and an $OR_4$ group, $R_4$ being a hydrogen atom or an organic radical of up to 20 carbon atoms (e.g. $C_{1-20}$ alkyl), provided that at least one of $R_1$, $R_2$ and $R_3$ is a halogen atom or an $-OR_4$ group. The aryl group or moiety thereof can be mono, di or tri-cyclic e.g. phenyl, naphthyl, benzyl etc.

Thus silica (e.g. in the form of a silica gel) having surface hydroxyl groups can, for example, be pretreated with a suitable ω-amino-($C_2$ to $C_{10}$ alkyl)-tri-($C_1$ to $C_5$ alkoxy)-silane to provide an active surface comprising amino groups. The silane can, for example, be γ-aminopropyltriethoxysilane. See, for example, the following patents wherein silica is treated with a silane: Canadian Patent Nos. 1,102,347, 1,103,035 and 1,102,346; U.S. Pat. Nos. 4,203,952, 3,886,080, 3,904,373, 3,519,538, 3,652,761, 4,230,803 and 4,290,892.

An obtained amino activated silica gel can be reacted with a suitable bifunctional compound to provide the gel with a functional group capable of reacting with the amino group of cysteine. Suitable bifunctional compounds include dialdehydes such as α,ω-(diformyl)alkanes, α,ω-(dihalo)alkanes, dicarboxylic acids and reactive derivatives of the latter such as acid halides, anhydrides, esters, etc. The acids can be α,ω-(dicarboxyl)alkanes. The alkyl moieties of the above referred to compounds can have up to 20 carbon atoms.

Glutaraldehyde may for example be used to provide a carrier having the functional group

which can be made to react with the amino group of cysteine via a Schiff base reaction, the obtained product being stabilized by being subjected to a Schiff base reduction treatment. In accordance with the Schiff base reduction treatment the group

is reduced to the group

The reduction treatment can be effected with any suitable reducing agent, for example, an anhydride such as sodium borohydride.

It is also possible to put some distance between a cysteine residue and the surface of the carrier, in order to limit the effect on the residue of a surface characteristic of the carrier. For example, teflon may be used as a carrier. However, teflon has a highly hydrophobic surface which is non-wetting. Therefore, it is desirable to put some distance between the surface of the teflon and the cysteine residue to allow the residue to extend well into an aqueous liquid medium.

A spacer compound may be used to provide a spacer group to space apart a carrier and a cysteine residue. A suitable spacer compound can be a bifunctional compound such as referred to above; i.e. it has a functional group which can react with a functional group of the carrier (e.g. hydroxyl, amino, aldehyde etc.) to bind it thereto; and it has also a second functional group which can react with the amino group of cysteine to bind it thereto: see the above groups. The spacer group may alternatively have a second functional group which while not reactive with the amino group of cysteine, may be convertible into such a group.

A spacer compound can, for example, in addition to the above referred to functional groups, include a hydrocarbon chain, the length of which is chosen in accordance with the distance which it is desired to place between the carrier and the compound. The spacer compound used may for example be 1-ethyl-3-(3-dimethylaminopropyl) carbodiimide hydrochloride salt or a straight chain dialdehyde of up to 20 carbon atoms such as glutaraldehyde. However any compound can be used which will space the compound from the carrier, the necessary or desired distance provided of course that it is bifunctional.

The spacer compound may be bound to a carrier by making use of conventional reactions involving the formation of ester groups, amide groups, amino groups, diazo groups, ether groups, sulphonamide groups, amidino groups; the reaction may be a carbon-carbon condensation.

Thus a suitable carrier for the present invention may be represented generally by the formula

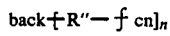

wherein n is an integer, <<back>> is a carrier backbone, R″, ⫞cn and the group —R″—⫞cn are as defined above. For example << cn>> may be a carboxyl group and R may be a group such as

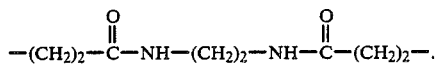

The carrier employed can have a porous structure preferably having a large specific surface.

When using a composition in accordance with the present invention, the conditions of use should of course be such as to avoid the break-down or decomposition of the composition; i.e. conditions such as "pH, temperature, pressure, etc." should be chosen so as to avoid the breakdown of the composition.

As indicated above, the above mentioned compositions can be used to remove mercury and/or the other metals listed hereinabove from a liquid medium. For example, the compositions can be intermixed with a desired liquid medium for a suitable time, which will of course depend upon the amount of composition used, the initial metal concentration, the desired final mercury concentration, etc. The metal loaded composition can then be physically recovered from the medium i.e. to effect separation of metal and medium. The affinity of the compounds for the metal can be so great that even small amounts of metal can be removed from a liquid medium.

The liquid medium to be treated to remove the metal, especially mercury can have, for example, a pH in the range of 4.5 to 9. During the contact with the composition, the temperature of the mixture can for example range from 1° C. to 50° C. and the contact can occur under atmospheric pressure. Examples of different media which can be treated with the compositions are as follows:

(i) Industrial water and waste water
incinerator scrub water;
effluent from chloralkali plant;
electroplating rinsewaters or wastes;
ore leachates;
soft gold plating dragouts;
(ii) Natural water
contaminated ground water.

As indicated previously, compositions in accordance with the present invention, may possibly be regenerated for further use by the removal of the metal therefrom by suitable chemical means. In this way, the composition can be economically used since it can be recycled for repeated use.

The regeneration, for example, of a composition loaded with mercury may be carried out by treating the mercury loaded composition with a suitable reagent such as 2-mercaptoethanol. Appropriate reagents and conditions should of course be chosen which will not decompose the composition or destroy the metal binding capacity thereof.

The insoluble compositions in accordance with the present invention thus provides for the advantageous removal of mercury from a liquid medium. The liquid medium referred to herein may be aqueous, organic or mixtures thereof.

Reference will be made to a number of nonrestrictive examples (infra) which deal with different embodiments of the present invention.

The methods of preparation used in the examples were analogous to those as described by H. Weetal & A. M. Filbert. Methods of Enzymology XXXIV B:59–72 1974.

In the examples, insoluble compositions were used to remove Hg and the other related metals from a liquid medium in accordance with the following procedure:

For the tests 3.14 cc of insoluble composition to be tested was initially placed in a 1.0 cm (i.d.) glass Bio-Rad Econo-column (i.e. bed height of about 4.0 cm). The composition was then subjected to one or more of the following steps:

(a) Metal loading step:

The composition was washed with about 10 bed volumes of deionized (e.g. distilled) water at maximum flow rate (up to 8.3 ml/min); 1 bed volume equaling about 3.14 ml. Thereafter the composition was treated with 4 bed volumes of an appropriate mercury regenerant (e.g. 10% (v/v) 2-mercaptoethanol in 2N HCl) at a flow rate of about 0.1 ml/min. The so treated composition was then washed again with deionized water as indicated above. Thereafter the solution to be treated was then passed through the column at a desired fixed flow rate (e.g. about 1.0 ml/min.) until the desired breakthrough point of the metal was observed in the column effluent (e.g. until the observed metal concentration in the effluent was 10% of the initial metal concentration). After the composition was thus saturated it was washed with ~10 bed volumes of deionized water to rinse off unbound metal.

(b) Regeneration step:

The metal loaded composition was treated with four bed volumes of appropriate mercury regenerant to remove Hg bound to the composition; the volume of regenerant used was in excess of amount necessary to liberate all removable Hg from the composition.

The combined metal loading step and regeneration step represents a complete cycle for the reuse of the composition which can be represented as follows:

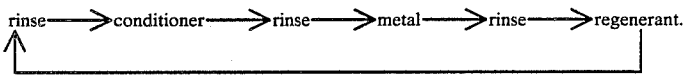

In the following examples, unless otherwise indicated the metal content of treated effluent was determined by atomic absorption spectrophotometric analysis (cold vapour technique) and the metal content of the initial solution was determined by inductively coupled plasma spectrometry. The residual concentration is the observed concentration of mercury in the treated effluent at the 50% point, i.e. the point at which about ½ of the total volume of treated solution had passed through the column, the total volume of treated solution being the volume of solution that had passed through the column up to desired breakthrough. The content of mercury in the regenerant was compared to the quantity of mercury originally bound to the composition to determine efficiency of mercury removal. Efficiency of regeneration can be calculated by comparing the capacity of the composition for mercury in successive cycles.

In the following examples nitrogen concentration of precursors was determined by a chloride titration technique; see L.C. Dorman, Tetrahedron Letters, 28, 2319 (1969).

EXAMPLE 1

Silica Gel: Amino Residues Covalently Bonded to the Surface thereof

Davison silica gel 62 hereinafter referred to as composition A (200 g) was suspended in 650 ml of deionized water and 88.5 gm (0.40 mole) of 3-aminopropyltriethoxysilane (Union Carbide A-1100) was added smoothly over about 1 minute. The pH of the resulting suspension was adjusted to 3.45 with concentrated aqueous hydrochloric acid (~38 ml, 0.46 mole). The mixture was heated to 75° C. and maintained at that temperature for about 2.5 hours. Thereafter the mixture was cooled to a manageable temperature (<50° C.) and the solid product recovered therefrom was water washed six times, each wash comprising suspending the solid product for about 10 to 15 minutes in about 500 ml of deonized water followed by recovery of the solid by vacuum filtration. The washed solid product was collected by vacuum filtration and dried in a forced air circulation oven at 110° C. to constant weight (about 18 hours), the so obtained dry product hereinafter being referred to as composition B. Chloride analysis of composition B showed a nitrogen concentration of 1.11 mole/kg silica.

The above amination can generally be described graphically as follows:

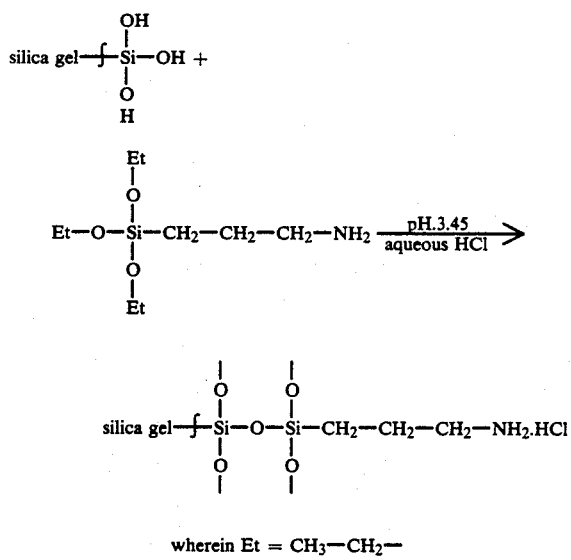

wherein Et = CH$_3$—CH$_2$—

EXAMPLE 2

(a) Silica Gel: Aldehyde Residue Covalently Bonded to the Surface thereof

A portion of the composition B obtained from example 1 (110 g, 0.12 mole of N) was suspended in 350 ml. of a solution of 0.1 M disodium hydrogen phosphate. The resulting suspension was adjusted to pH 7 with aqueous 10% sodium hydroxide solution and the system was degassed by application of water aspiration vacuum for several minutes. When gas evolution had ceased the so evacuated system was filled with an argon atmosphere and 200 ml of an aqueous 25% solution of glutaraldehyde (0.5 mole; 4.2 equiv.) was added. The mixture was stirred at 25° C. for 1.5 hours. Thereafter the obtained solid product which was orange-tan in colour was water washed six times each wash step comprising suspending the solid product for 5-10 minutes in about (500 ml) deionized water followed by recovery of the solid product (wet) by vacuum filtration.

The reaction outlined above can be represented graphically as follows:

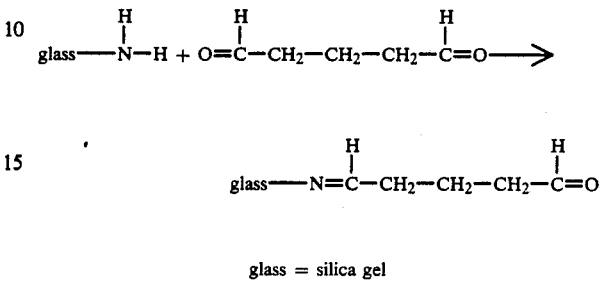

glass = silica gel (b) Silica Gel: Cysteine Residue Covalently Bonded to the Surface thereof The washed wet solid product recovered in accordance with example 2(a) above was resuspended in 150 ml of a solution of cysteine hydrochloride monohydrate (26 g, 0.148 mole, 1.23 equiv) in aqueous saturated borax of pH 8.5; the pH of the solution was adjusted to 8.5 prior to bringing it into contact with the wet solid product. The reaction flask was flushed with argon and heated to 65° C. for 2 hours. The mixture was then cooled (<50° C.) and water washed three times each wash step comprising suspending the solid product for 5-10 minutes in about 500 ml deionized water, followed by recovery of the solid product (wet) by vacuum filtration.

The washed wet product was then resuspended in 200 ml of deionized water, and 10 g (0.26 mole; 2.2 equiv) sodium borohydride was admixed therewith. The reaction mixture was stirred for 1 hour. The solid product was then water washed twice as outlined above, washed once by a similar treatment comprising suspending the solid product for 15 minutes in 200 ml 1N aqueous hydrochloric acid followed by five water washings as outlined above. The so washed product was resuspended in 0.1N hydrochloric acid and the solid product was collected by vacuum filtration and stored as a wet cake wetted with the dilute hydrochloric acid. The obtained product is hereinafter referred to as composition C.

EXAMPLE 3

Tests were conducted to evaluate the contribution of the cysteine residue with respect to the capture of Hg and also the effect of a number of regenerants on removal of mercury from a mercury loaded insoluble composition provided with such residue. The mercury containing solution consisted of an aqueous solution of wastewater of pH 8.2 containing the following elements:

| METAL | CONC* |
|---|---|
| Hg | 100 ppm |
| Mg | 2.84 ppm |
| Na | 69.3 g/l |
| Sr | 0.24 ppm |
| B | 8.85 ppm |
| Si | 51.4 ppm |

-continued

| METAL | CONC* |
|---|---|
| Ca | 20.1 ppm |
| Zn | 2.36 ppm |
| Fe | 1.28 ppm |

*by inductively coupled plasma spectrometric analysis

A first series of tests were conducted using composition A, composition B and composition C. As can be seen from table 1 below compositions A and B which are precursors for composition C have a significantly lower capacity to take up Hg in relation to composition C which includes the cysteine residue.

In another series of tests three separate aliquots of composition C were used to treat samples of the above wastewater. The lots were each then treated with a different reagent to compare the relative mercury removal efficiencies thereof. The results are seen in table 2

TABLE 1

(table 6)
Mercury uptake

| | Hg concentration (ppm) | | Metal uptake- |
|---|---|---|---|
| Composition | untreated solution | treated solution - residual concentration$^{(a),(b)}$ | mg Hg bound/kg composition to 10% breakthrough |
| A | 100 | ~10 | <92 |
| B | 100 | ~10 | <92 |
| C | 100 | 0.005 | 4462 |

$^{(a)}$concentration determined by atomic absorption spectrophotometry (cold vapour technique)
$^{(b)}$residual concentration defined as metal concentration in treated effluent at the 50% point between initial elution of treated effluent and 10% breakthrough

TABLE 2

(table 7)
The effect of various regenerants on mercury removal

| | Hg conc. (ppm) | | |
|---|---|---|---|
| Regenerant$^{(b)}$ | untreated solution | treated solution - residual concentration$^{(a),(c)}$ | % Hg removal from Hg loaded composition |
| I | 100 | 0.02 | 22 |
| II | 100 | 1.0 | ~100 |
| III | 100 | <0.02 | ~95 |

$^{(a)}$concentration determined by atomic absorption spectrophotometry (cold vapour technique)
$^{(b)}$regenerant used
I - 2 N HCl
II - 10% (v/v) 2-mercaptoethanol in deionized water
III - 10% (v/v) 2-mercaptoethanol in 2N HCl
$^{(c)}$residual concentration defined as metal concentration in treated effluent at the 50% point between initial elution of treated effluent and 1% breakthrough.

EXAMPLE 4

100 g. Davison grade 12 silica gel of mean pore diameter 22 Å was suspended in 300 ml of water and stirred with a mechanical paddle type stirrer. 0.050 mole of 3-aminopropyltriethoxysilane (Union Carbide A-1100) was added smoothly over about 1 minute. The pH of the resulting suspension was adjusted to 3.45 with about 0.055 mole of concentrated aqueous hydrochloric acid.

The reaction mixture was heated to 75° C. and maintained at that temperature for about 2.5 hours. The mixture was then cooled to a manageable temperature (i.e. <50° C.) and the recovered solid product was water washed six times, each water wash comprising suspending the solid product for 10–15 min in about 500 ml of deionized water and recovering the product as outlined above. The washed solid product was finally collected by vacuum filtration and dried in a forced air circulation oven at 110° C. to constant weight (about 18 hours).

Chloride analysis of the dried product showed implied nitrogen concentration of 0.55 mole/kg.

The solid product obtained by the above procedure was suspended in 325 ml of an aqueous 0.1 M solution of disodium hydrogen phosphate. The resulting suspension was adjusted to pH 7 with aqueous 10% sodium hydroxide solution (a few milliliters) and the system was degassed by application of water aspirator vacuum for several minutes whereupon the flask was filled with air.

83.2 ml of a commercial aqueous 25% solution of glutaraldehyde (Aldrich, 0,208 moles at 2.5 Molar) was added rapidly. The mixture was stirred at 25° C. for 1.5 h. The solid product obtained which was orange-tan in colour was water washed six times using the wash procedure outlined above.

The wet solid product recovered was suspended in 250 ml of a solution of cysteine hydrochloride monohydrate (i.e. 0.080 mole of cysteine) in aqueous saturated borax. The pH of this latter solution was adjusted to 8.5 with a small amount of aqueous sodium hydroxide prior to contacting it with the aldehyde active solid product. The reaction flask was then flushed with argon, heated to 65° C. and, maintained at that temperature for 2 hours. The reaction mixture was then cooled to a manageable temperature (i.e. <50° C.) and the solid product was water washed twice, each wash step comprising suspending the solid product for 5–10 min in 400 ml of deionized water followed by recovery of the product by vacuum filtration.

The so obtained wet solid was then resuspended in water (~200 ml) and 0.114 mole of solid sodium borohydride was added. The mixture was stirred at 25° C. for 1 hour then washed according to the following formula; water (500 ml), 1N aqueous HCl (500 ml, 15 min. exposure time), water (5×500 ml), 0.1N aqueous HCl (500 ml) by sequential aspiration of fluids and resuspension of solids in the specified fluid as outlined previously.

The solid product (hereinafter designated as composition D) was collected by vacuum filtration and stored as a wet cake wetted with the final dilute hydrochloric acid treatment.

EXAMPLE 5

200 g, (dry weight), of an aldehyde active silica gel (i.e. a silica gel having aldehyde residues covalently bound to its surface) in the form of a wet cake, (i.e. wetted with water) having 0.33 mole/kg theoretical assay of CHO, was mixed with 200 ml of an aqueous saturated borax solution; the aldehyde active silica gel was prepared as outlined below starting from a Davision Grade 12 silica gel. 100 ml of a solution comprising 17.23 g of L-cysteine hydrochloride monohydrate (0.098 mole; 1.49 equiv) in a saturated aqueous borax solution was adjusted to pH 8.5 with a few drops of 50% aqueous sodium hydroxide. This solution was added to the suspension above and the mixture was stirred and briefly subjected to reduced pressure (~10 mm Hg). It was then heated to 65° C. and maintained at that temperature for 2 hours. The reaction mixture was then cooled to a manageable temperature (i.e. <50° C.) and the fluids were removed by aspiration. The remaining solids were water washed twice each wash step comprising suspending the solid in 500 ml of deionized water for ~10 min, followed by recovery of the solid by vacuum filtration. The so obtained wet solid was resuspended in 200 ml of deionized water and 5.5 g solid sodium borohydride (0.145 mole, 2.2 eq) was added cautiously. The mixture was stirred at 25° C. for 1 hour and then the reaction fluids were removed by vacuum aspiration. The obtained solid was washed once by resuspension for a few minutes in 400 ml of water. The wet solid recovered by filtration was then treated with 500 ml of aqueous 1 N hydrochloric acid for 10 minutes, followed by water washing 5 times as above i.e. with 500 ml portions of deionized water. The recovered wet product was then suspended in 0.1 N aqueous hydrochloric acid for 5-10 min. The solid was then collected by vacuum filtration and stored as a wet cake wetted with dilute HCl; the obtained product hereinafter being referred to as composition E.

The aldehyde active silica gel referred to above was prepared in accordance with the following procedure:

(a) silica gel amination stage

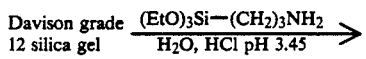

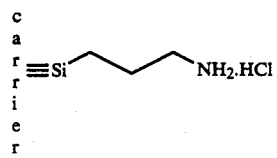

wherein $Et=CH_3-CH_2-$

Dry silica gel (2.00 kg) was added to 2.4 l of deionized water while stirring.

To the stirred suspension was added, in a steady stream, 232.6 ml of 3-aminopropyl-triethoxysilane (Union Carbide A-1100, 221 g, 1.00 mole) over a minute or so. After a few minutes (<5 min) to allow complete mixing conc hydrochloric acid (approximately 83.3 ml of 12 N solution, 1.00 mole) was added quickly in a steady stream (1 min). Sufficient acid was added to bring the pH to 3.45.

The acidified mixture was heated to 75° C. over 20 min. and maintained at that temperature for 1 hr.

The reaction mixture was then allowed to cool briefly and the solid product was recovered. The solid was washed with deionized water (3-4×2 L). The washed solid was then isolated on a Buchner filter and dried to constant weight in a ventilated oven at 110° C. in glass or enamelled metal pans.

(b) aldehyde activated silica gel

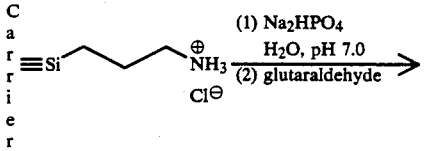

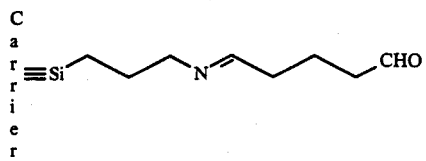

A solution of disodium hydrogen phosphate heptahydrate was prepared by dissolving the heptahydrate (67.0 g, 0.25 moles) in deionized water and diluting to a total volume of 2.50 L to make a 0.1 M solution. 2.00 kg of the above aminated silica gel (wet) was added slowly to the stirring buffer. The pH of the slurry was then adjusted to 7.0 with 10% sodium hydroxide.

The system was de-gassed by evacuation using a water aspirator vacuum. Thereafter an inert gas (e.g. argon or nitrogen) was introduced to prevent oxidation of aldehyde in the reagent and product.

Sufficient glutaric dialdehyde as a commercially available 25% solution in water (Aldrich Chemical CO) was added rapidly.

The mixture was stirred for 1.5 hrs. at room temperature. After the reaction was complete the slurry was filtered to dryness and the obtained solid was washed with deionized water (4-5×2 L), allowing 10 minutes of stirring for each wash. The obtained wet product was then used to make the cysteine composition referred to above.

EXAMPLE 6

Tests were conducted to see the effect of flow rate on the removal of Hg from solution using cysteine composition E referred to in example 5. The tests were conducted as outlined previously. Separate aliquots of the same composition were used in each of the tests or runs. The solution treated in each case was an aqueous solution of wastewater of pH 8.2 containing the following elements.

| METAL | CONC |
|---|---|
| Hg | 14.0 ppm* |
| Mg | 2.84 ppm |
| Na | 69.3 g/l |
| Sr | 0.24 ppm |
| B | 8.85 ppm |
| Si | 51.4 ppm |
| Ca | 20.1 ppm |
| Zn | 2.36 ppm |
| Fe | 1.28 ppm |

*Hg analysis by atomic absorption spectrophotometry (cold vapour technique); other elements by inductively coupled plasma spectrometric analysis.

The results of the runs are shown in the following table 3, the residual concentration being determined relative to 1% breakthrough rather than 10% breakthrough.

TABLE 3

(table 8)

| Run no. | Flow rate ml/hr | Hg conc (ppm) untreated solution | treated solution - residue concentration[e] |
|---|---|---|---|
| 1 | 31.4 | 14.0 | <0.03 |
| 2 | 62.8 | 14.0 | <0.03 |
| 3 | 94.2 | 14.0 | <0.03 |

[e]residual concentration defined as metal concentration in treated effluent at the 50% point between initial elution of treated effluent and 1% breakthrough (supra); see also (a) for Table 1.

EXAMPLE 7

Tests were conducted in accordance with the method outlined previously using cysteine composition E wherein the composition was subjected to a number of complete cycles, i.e. a number of metal loading/regeneration steps one after the other. The solution treated was the same as that described in example 6 above.

The regenerant used was 10% (v/v) of mercaptoethanol in 2N HCl. The flow rate used was 6.0 ml/hr.

The results of the test are shown in Table 4 below:

TABLE 4

(table 9)

| Cycle no. | Hg conc. (ppm) | | Metal uptake - mg Hg/kg composition to 1% breakthrough |
|---|---|---|---|
| | untreated solution | treated solution - residual concentration(f) | |
| 1 | 14.0 | <.004 | ≅1100 |
| 2 | 14.0 | <.004 | ≅1100 |
| 3 | 14.0 | <.004 | ≅1100 |
| 4 | 14.0 | n.d.(g) | n.d.(g) |
| 5 | 14.0 | <.004 | ≅1100 |

(f)see (e) above for Table 3
(g)not determined

EXAMPLE 8

Preparation of Cysteine Compositions Starting from Silica Gels of Differing Mean Pore Diameter.

(a) Silica gel amination stage

Amine compositions F, G and H were each prepared as follows:

100 g of a respective starting silica gel specified in the table 5 was washed once with ethanol (denatured with 15% methanol) by suspension in the volume of solvent specified in the table and removal of the free fluids by aspiration. The same volume of fresh solvent was then added and the mixture stirred into suspension. Then 3-aminopropyltriethoxysilane (Union Carbide, A-1100) was added in the quantity specified in table 5. The mixture was quickly heated to and maintained at reflux for 2 hours. The reaction mixture was cooled to a manageable temperature (<50° C.) and the fluids were removed by aspiration. The obtained solid was washed twice by consecutively suspending it in the volume of ethanol specified in table 5, followed by aspiration of the fluids. The so washed solid was then resuspended in aqueous 1N hydrochloric acid (250 ml) for 30 minutes then washed five times by repeated aspiration of the fluids and resuspension for several minutes in deionized water. The solid product was collected by vacuum filtration and dried in a forced circulation oven at 110° C. to constant weight (~18 hours).

Chloride analysis of a sample of the dried product gave a value for the nitrogen content of each sample as specified in Table 5.

TABLE 5

(table 1)

| Starting Silica Gel | Mean Pore Diam. Å - Starting Silica Gel | Volume of Ethanol (ml) | Quantity A-1100 (mole) | [N] (mole/kg) | Amine Composition |
|---|---|---|---|---|---|
| Davison 12 | 22 | 100 | 0.05 | 0.43 | F |
| Merck 60 | 60 | 200 | 0.05 | 0.60 | G |
| Davison 62 | 140 | 200 | 0.05 | 0.68 | H |

(b) Aldehyde activated silica gel

Aldehyde compositions I, J and K were each prepared as follows:

90 g of respective amine composition F, G or H prepared as described above was suspended in a quantity of aqueous disodium hydrogen phosphate (see table 6) and the pH was adjusted to 7.0 with aqueous 10% sodium hydroxide. 80 ml of a commercial aqueous 25% solution of glutaraldehyde (0.20 mole) was added and the reaction mixture was stirred at room temperature of 1½ hours. The fluids were then removed by aspiration and the solid product washed three times by resuspension in water (5-10 min) followed by aspiration of the washings. The washed wet solid product was then used directly in the next stage of the process.

TABLE 6

(table 2)

| Starting amine composition | Volume of phosphate Solution (ml) | Aldehyde composition |
|---|---|---|
| F | 100 ml | I |
| G | 200 ml | J |
| H | 250 ml | K |

(c) Cysteine composition

Cysteine compositions L, M and N were prepared as follows:

A respective starting aldehyde compositions I, J or K was suspended in an aqueous saturated solution of borax (quantity specified in table 7) to which 11.8 9 of L-cysteine hydrochloride monohydrate (0.068 mole) has previously been added the pH of the borax solution having been adjusted to 8.5 with aqueous 10% sodium hydroxide prior to admixing with the solids. The suspension was then heated quickly to 65° C. under an argon atmosphere and maintained at that temperature for 2 hours. The fluids were aspirated and the solid product washed three times by successive resuspensions in 300 ml of water for about 5-10 minutes followed by aspiration of the washings. The wet solid was then suspended in the volume of water specified in table 7 and 4.25 g sodium borohydride (0.113 mole) was added. The mixture was stirred at room temperature for 24 hours. The solids were then recovered and were washed once by resuspension in 300 ml of deionized water for about 5-10 min. followed by recovery of the product (wet). The so washed wet solid product was subjected to treatment with (200 ml) aqueous 1N hydrochloric acid once and water washed thereafter with deionized water three times to give the finished product which was collected by vacuum filtration and stored as a wet cake wetted with water.

TABLE 7

(table 3)

| Starting Aldehyde Composition | Volume of Borax/Cysteine Solution (ml) | Volume of Water for reduction (ml) | Cysteine Composition |
|---|---|---|---|
| I | 100 | 100 | L |
| J | 200 | 200 | M |
| K | 250 | 250 | N |

EXAMPLE 9

Cysteine composition E, D and C were each used to treat a starting solution having the characteristics of the solution in example no. 6 (supra).

The compositions were loaded with metal as outlined above. The results can be seen in Table 8:

TABLE 8

(table 4)

| Cysteine Composition | Mean pore diam (Å) of starting silica gel | Hg conc. (ppm) untreated solution | treated solution - residual concentration[h] | Hg uptake - mg Hg/Kg composition to 1% breakthrough |
|---|---|---|---|---|
| E | 22 | 14 | <0.03 | ≈630 |
| D | 22 | 14 | <0.03 | ≈1500 |
| C | 140 | 14 | <0.005 | ≈4000 |

[h]see (e) above for table 3.

EXAMPLE 10

Cysteine composition L, M and N were each used to treat a starting solution having the following characteristics:

wastewater of pH 8.2 containing the following:

| METAL | CONC |
|---|---|
| Hg | 100 ppm |
| Mg | 2.84 ppm |
| Na | 69.3 g/l |
| Sr | 0.24 ppm |
| B | 8.85 ppm |
| Si | 51.4 ppm |
| Ca | 20.1 ppm |
| Zn | 2.36 ppm |
| Fe | 1.28 ppm |

The metal loading was carried out as outlined above and the results are shown in the following table 9:

TABLE 9

(table 5)

| Cysteine Composition | Mean pore diam. (Å) of starting silica gel | Hg conc. (ppm) untreated solution | treated solution - residual concentration[i] | Hg uptake mg Hg/Kg composition to 10% breakthrough |
|---|---|---|---|---|
| L | 22 | 100 | <1.0 | 783 |
| M | 60 | 100 | <1.0 | 4960 |
| N | 140 | 100 | <1.0 | 6992 |

[i]see (b) above for table 1.

EXAMPLE 11

A number of tests were conducted with cysteine composition C and cysteine composition N using the metal loading step outlined previously, using various types of solutions containing Hg. The results of the tests are outlined in table 10, the composition of the solutions being outlined in table 11 below.

TABLE 10

(table 11)

| Cysteine Composition | Hg conc. untreated solution (m) | treated solution - residual conc.[j] | Solution[l] |
|---|---|---|---|
| C | 0.9 ppb | N.D.[k] | I |
| N | 100 ppm | <1 ppm | II |
| C | 0.21 ppm | <0.01 ppm | III |
| C | 3.35 ppm | <0.1 ppm | IV |
| C | 7.54 ppm | <0.1 ppm | V |

[j]see (b) above for table 1
[k]not detectable
[l]see table 11 below
[m]analysis by inductively coupled plasma spectrometry.

TABLE 11

(Annexe V)

| Solution no. | Nature of solution | Ph | Element | Conc.[n] |
|---|---|---|---|---|
| I | polished water | 8.3 | Hg | 0.9 ppb |
| | | | Fe | 0.33 ppm |
| | | | Si | 1.4 ppm |
| | | | B | 0.57 ppm |
| | | | Na | 0.2 ppm |
| II | wastewater | 8.3 | Hg | 100 ppm |
| | | | Mg | 2.84 ppm |
| | | | Na | 69.3 g/l |
| | | | Sr | 0.24 ppm |
| | | | B | 8.85 ppm |
| | | | Si | 51.4 ppm |
| | | | Ca | 20.1 ppm |
| | | | Zn | 2.36 ppm |
| | | | Fe | 1.28 ppm |
| III | contaminated ground water | 7 | Hg | 0.21 ppm |
| | | | Ca | 37.8 ppm |
| | | | Zn | 0.04 ppm |
| | | | Sr | 0.95 ppm |
| | | | Mg | 18.2 ppm |
| | | | Na | 2168 ppm |
| | | | Si | 7.81 ppm |
| | | | B | 0.51 ppm |
| | | | Mn | 0.014 ppm |
| | | | Fe | 0.62 ppm |
| IV | chloroalkaline process waste water | 7 | Hg | 3.35 ppm |
| | | | Al | 0.72 ppm |
| | | | Ca | 5.66 ppm |
| | | | Zn | 1.16 ppm |
| | | | Sr | 0.13 ppm |
| | | | Na | 4068 ppm |
| | | | Si | 16.8 ppm |
| | | | B | 0.26 ppm |
| | | | Fe | 0.19 ppm |
| V | dechlorinated water | 7 | Hg | 7.54 ppm |
| | | | Al | 0.60 ppm |
| | | | Ca | 1.83 ppm |
| | | | Zn | 0.10 ppm |
| | | | Sr | 0.03 ppm |
| | | | Na | 3674 ppm |
| | | | Si | 10.9 ppm |
| | | | B | 0.21 ppm |
| | | | Fe | 0.18 ppm |

[n]analysis by inductively coupled plasma spectrometry.

EXAMPLE 12

Removal of Copper from Electroplating Rinsewaters

Samples of copper sulfate plating rinsewater were treated by contacting with a composition of cysteine covalently fixed to a silica gel support, analogous to the composition C described in the examples above. The starting wastewater samples had the characteristics described in the Table 12 below.

A column of the test composition was suitably pretreated and activated with aqueous 0.25 M sodium bicarbonate. The effluent was passed over the column and the eluant collected and analysed. Copper concentrations in the treated effluent are reported in the Table 12 below.

TABLE 12

| | sample 1 [Cu] | sample 2 [Cu] | sample 3 [Cu] | sample 4 [Cu] |
|---|---|---|---|---|
| column influent | 442 ppm | 220 ppm | 96.6 ppm | 12.1 ppm |
| column effluent | 0.44 ppm | 2.7 ppm | 0.97 ppm | 0.012 ppm |
| influent pH | 5.5 | 5.5 | 5.5 | 5.5 |
| derived Cu Capacity (mg/ml) | 4.89 | 4.75 | 4.35 | 3.59 |

EXAMPLE 13

Removal of Zinc and Nickel from Plating Waste

A sample of zinc containing supernatant from the magnesium hydroxide precipitation treatment of a chromate plating effluent had the characteristics shown below. Treatment of this zinc containing waste with a fresh portion of the same composition as used in example 12 above and using the same general method gave treated effluent with the characteristics illustrated in the following Table 13.

TABLE 13

| | metal concentration (ppm) | | | | | | |
|---|---|---|---|---|---|---|---|
| | pH | Cr | Fe | Zn | Ni | Cu | Ca | Mg |
| column influent | 7.6 | 0 | 0 | 44.1 | 0.7 | 0.27 | 52.4 | 2391 |
| treated effluent | 7.2 | 0 | 0 | 0.45 | <0.01 | 0.03 | 55.4 | 2381 |
| derived Zn. capacity | | | | 4.4 mg/ml | | | | |

EXAMPLE 14

Removal of Cadmium from Plating Wastes

A sample of cadmium containing wastewater obtained after hypochlorite treatment of rinsewater from a cadmium-cyanide electroplating operation had initial characteristics shown below. After treatment of this waste with a fresh portion of the same composition as used in example 12 and in the same general manner, the treated effluent had the heavy metal concentrations shown below.

TABLE 14

| | pH | [Cd] | [Fe] |
|---|---|---|---|
| column influent | 7.2 | 9.37 ppm | 3.36 ppm |
| treated effluent | | 0.1 ppm | 2.0 ppm |

EXAMPLE 15

Removal of Platinum and Palladium from Ore Leachate.

A sample of platinum/palladium ore leachate at pH 5.2 was treated with a fresh sample of the composition described in example A above in a stirred vessel and in a batchwise manner. The characteristics of the fluid component before and after treatment are described below.

TABLE 15

| Metal | Concentration (ppm) before treatment | Concentration (ppm) after treatment | Metal binding efficiency (%) |
|---|---|---|---|
| Pd | 1180 | 215 | 81.8 |
| Pt | 87.2 | 1.7 | 98.1 |
| Ag | 2.54 | 0.42 | 83.5 |
| Cu | 39.7 | 34.9 | 12.1 |

This Table also shows that the cysteine composition is useful to remove silver. The fact that the copper concentration has not been substantially reduced as it was in example 12, may be explained by high complexation affinity of cysteine to palladium and platinum.

EXAMPLE 16

Removal of Gold from Soft Gold Plating Dragout

A sample of soft gold plating dragout had the characteristics shown below. After treatment with a fresh portion of the test composition described in example 12 above and, in a similar manner, the effluent showed the characteristics shown in the following Table 16.

TABLE 16

| | metal concentration (ppm) | | | |
|---|---|---|---|---|
| | pH | Au | Co | Cu | Ni |
| column influent | 7.5 | 1978 | 0.19 | 36.6 | 43.2 |
| column effluent | | 19.8 | 0.02 | 0.37 | 0.4 |
| derived Au Capacity | | 8.54 mg/ml | | | |

What is claimed is:

1. A process for removing at least one metal selected from the group consisting of mercury, cadmium, zinc, copper, silver, gold, platinum, palladium and nickel, from a liquid medium, characterized in that said medium is contacted with an insoluble composition comprising:
   (i) a cysteine residue covalently fixed at the nitrogen atom thereof to the surface of
   (ii) a suitable insoluble carrier.

2. A process as defined in claim 1, wherein the nitrogen atom of said cysteine residue is fixed to the surface of the carrier by a covalent linkage comprising a chain of atoms, said chain including an additional nitrogen atom covalently linked to the nitrogen atom of said cysteine residue by a hydrocarbon chain of five carbon atoms.

3. A process as defined in claim 2, wherein said hydrocarbon chain comprises five methylene groups and wherein said additional nitrogen atom and the nitrogen atom of said cysteine residue are each linked to said hydrocarbon chain by a single covalent bond.

4. A process as defined in claim 1, wherein the carrier is silica gel.

5. A process as defined in claim 2, wherein the carrier is silica gel.

6. A process as defined in claim 3, wherein the carrier is silica gel.

7. A process as defined in claim 1, wherein the medium is in an aqueous liquid medium.

8. A process as defined in claim 1, wherein the metal to be removed is mercury.

9. A process as defined in claim 1, wherein the metal to be removed is selected from the group consisting of cadmium, zinc, copper, gold, platinum and palladium.

* * * * *